United States Patent
Magnuson (10) Patent No.: US 9,073,162 B2
(45) Date of Patent: Jul. 7, 2015

(54) METHOD AND APPARATUS FOR CUTTING A MILL PLATE

(75) Inventor: James Magnuson, Kankakee, IL (US)

(73) Assignee: Peddinghaus Corporation, Bradley, IL (US)

( * ) Notice: Subject to any disclaimer, the term of this patent is extended or adjusted under 35 U.S.C. 154(b) by 788 days.

(21) Appl. No.: 13/328,141

(22) Filed: Dec. 16, 2011

(65) Prior Publication Data

US 2013/0156522 A1 Jun. 20, 2013

(51) Int. Cl.
| | |
|---|---|
| *B23C 3/13* | (2006.01) |
| *B23C 3/00* | (2006.01) |
| *B23Q 15/22* | (2006.01) |
| *B23K 7/00* | (2006.01) |
| *B23K 10/00* | (2006.01) |
| *B21B 15/00* | (2006.01) |

(52) U.S. Cl.
CPC ....... *B23Q 15/22* (2013.01); *Y10T 409/300896* (2015.01); *Y10T 409/30112* (2015.01); *B23K 7/002* (2013.01); *B23K 10/00* (2013.01); *B23C 3/002* (2013.01); *B21B 15/0007* (2013.01)

(58) Field of Classification Search
CPC .......... B23C 3/002; B23C 9/005; B23C 1/08; B23C 2220/40; B23C 2270/08; B23D 55/04; B23D 55/043; B23D 55/046; B23D 47/042; B23Q 7/003; B23Q 15/22; B23K 10/00; B23K 7/002; B21B 15/0007
USPC ............................ 29/561; 83/144; 198/341.05
See application file for complete search history.

(56) References Cited

U.S. PATENT DOCUMENTS

| | | | |
|---|---|---|---|
| 3,954,044 A | | 5/1976 | Ridgway |
| RE30,757 E | * | 10/1981 | Gerber ............................. 83/74 |
| 5,353,910 A | * | 10/1994 | Harris et al. ............... 198/345.1 |
| 5,904,788 A | | 5/1999 | Kitajima et al. |
| 6,231,036 B1 | * | 5/2001 | Johnson et al. .................. 269/56 |
| 6,327,761 B1 | * | 12/2001 | Magnuson .................... 29/33 Q |
| 6,739,228 B1 | | 5/2004 | Magnuson |
| 7,259,872 B2 | | 8/2007 | Mullikin |
| 2003/0110618 A1 | * | 6/2003 | Magnuson ...................... 29/720 |
| 2005/0132664 A1 | | 6/2005 | Bettini |
| 2010/0194013 A1 | * | 8/2010 | Hall et al. ........................ 269/56 |

OTHER PUBLICATIONS

The "International Search Report and the Written Opinion of the International Searching Authority, or the Declration" dated Dec. 7, 2012 for PCT/US2012/055430.

* cited by examiner

*Primary Examiner* — Eric A Gates
*Assistant Examiner* — Paul M Janeski
(74) *Attorney, Agent, or Firm* — Wood, Phillips, Clark, Katz & Mortimer

(57) ABSTRACT

A cutting device for a mill plate including a cutting tool supported for movement in a Y-direction and cutting in a Z-direction, and a conveyor for conveying a mill plate in the X-direction. A measuring device is movable in the X-direction along one side of a mill plate supported on the conveyor to map the X-axis and Y-axis positions of the mill plate one side. Positioning guides adjacent one side of the conveyor are adjusted in the Y-direction to follow the mapped Y-axis position of the mill plate one side at the X-axis position of the mill plate one side aligned with the positioning guides as the mill plate is conveyed in the X-direction. A clamp on the side opposite the mill plate one side is adapted to push the mill plate opposite side in the Y-direction to maintain the mill plate one side in engagement with the positioning guides.

10 Claims, 11 Drawing Sheets

METHOD AND APPARATUS FOR CUTTING A MILL PLATE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to machining, and more particularly to machining mill plates.

BACKGROUND OF THE INVENTION

It is well known to use machine tools to cut pieces of various required shapes from larger base or stock materials.

In some cases, the pieces are cut from large (e.g., twenty feet long or longer), flat materials, such as mill plates, made of thick and heavy metal. That size makes such plates difficult to handle, and further can require a large footprint for the machine tool in a facility to provide the space needed for handling. Still further, given the complexity and size of the machine tools required to cut such materials, machine tools which have often heretofore been used in such applications provide a tool which will move in one axis of the plane of the plate (the Y-axis), in which case the mill plate itself is moved in a perpendicular axis (the X-axis).

Mill plates such as mentioned above have generally rectangular shapes with generally flat sides or edges. However, the generally flat edges are typically formed with tolerances which can result in some curvature to the "flat" edges.

Machining of such mill plates typically has been accomplished by moving the mill plate while it is being machined moved with one of its "flat" edges oriented in the one (X-axis) direction and maintained in that orientation by pressing the plate edge against one or more guides oriented in the direction of plate movement (the X-axis). However, particularly where high precision is required for the cut piece, mill plate tolerances resulting in some curvature in the edge of the large mill plate can result in undesirable curvature also in the cut piece, as illustrated in FIGS. 1a-1e and FIGS. 2a-2e, which illustrate prior art methods of cutting of a rectangular piece from a mill plate 20. (For illustration purposes, the curvature of the mill plate edges is greatly exaggerated in the Figures.).

In the prior art method illustrated in FIGS. 1a-1e, a mill plate 20 is supported on an entry conveyor 24 having a plurality of datum rollers 28 pivotable about horizontal axes aligned in a horizontal plane, whereby the mill plate 20 will generally move in the horizontal direction perpendicular to the axes of the datum rollers 28.

A suitable cutting tool 30 is supported by a machine tool (not shown in FIGS. 1a-1e) for selective lateral movement across the width of the mill plate 20 (i.e., in a vertical direction in FIGS. 1a-1e).

Adjacent the area of the cutting tool 30 are a plurality of vertical datum rollers (i.e., fixed guide rollers) 34 (pivotable about vertical axes) arranged in a vertical plane substantially perpendicular to the horizontal plane/axes of the entry conveyor rollers 28. The vertical datum rollers 34 define abase position for the side of the mill plate 20 in the area of the cutting tool 30.

On the conveyor side opposite the vertical datum rollers 34 is a pusher 40 having a roller 44 (rotatable about a vertical axis) which is biased (e.g., by a piston 46) to engaging the other side or edge 48 of the mill plate 20. The pusher 40 pushes the mill plate 20 into engagement with the vertical datum rollers 34 on the opposite side of the conveyor 24. The mill plate 20 is thus essentially oriented so that the longitudinal direction of the mill plate 20 is considered to be the direction of the edge 50 of the mill plate 20 located at the vertical datum rollers 34.

Figure 1A:
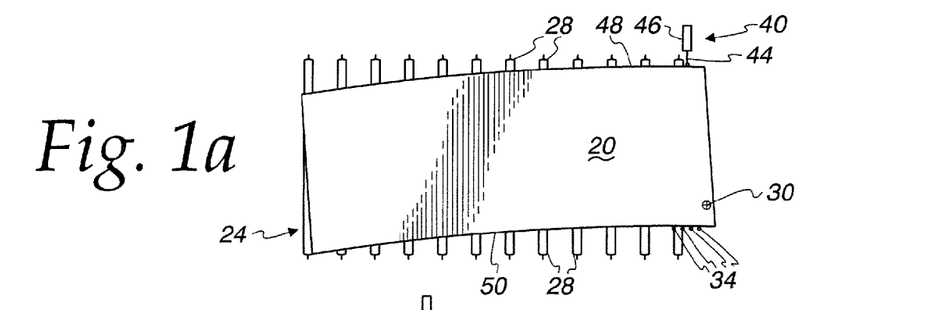
FIG. 1a shows the mill plate to be cut with a tool at the initial cutting position.
Figure 1B:
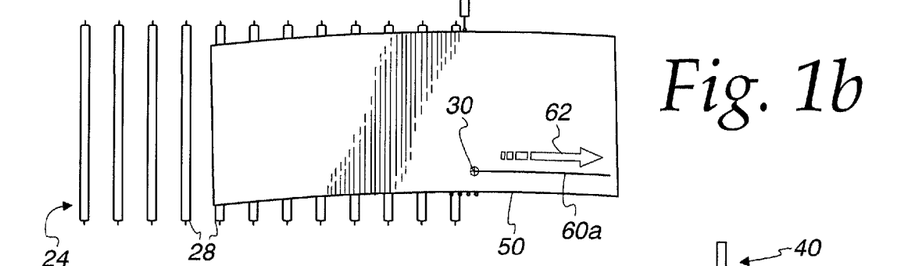
FIG. 1b shows the mill plate as moved to cut a first side of the rectangular piece.
Figure 1C:
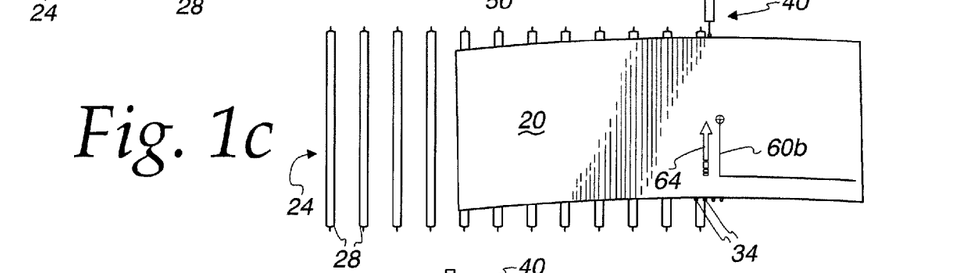
FIG. 1c shows the mill plate as the tool is moved to cut a second side of the rectangular piece.
Figure 1D:
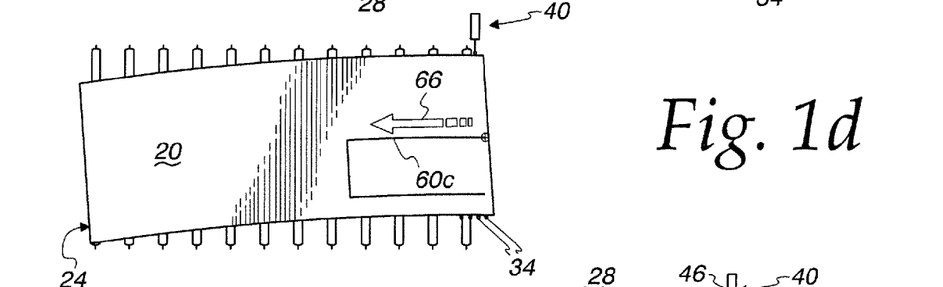
FIG. 1d shows the mill plate as moved to cut a third side of the rectangular piece.
Figure 1E:
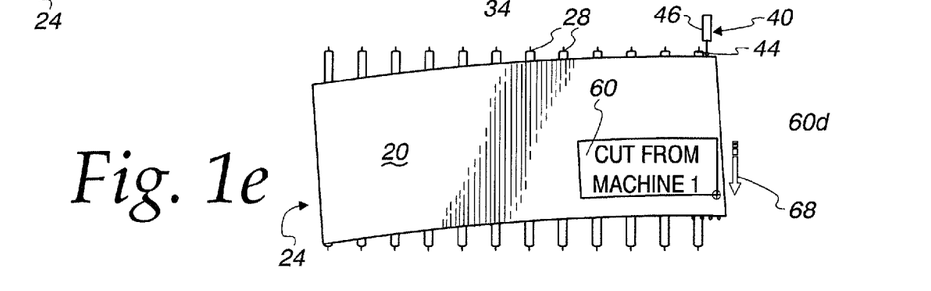
FIG. 1e shows the mill plate as the tool is moved to cut the fourth, final side of the rectangular piece.
Figure 2A:
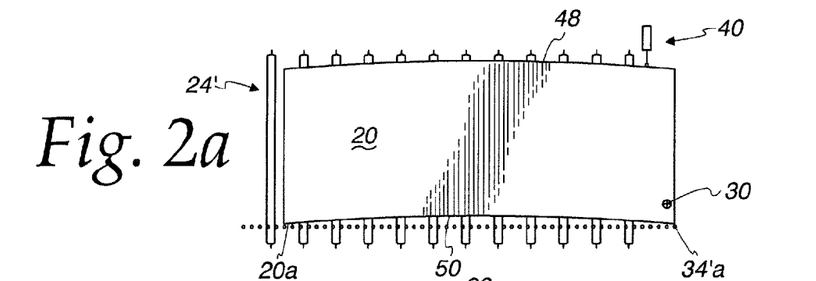
FIG. 2a shows the mill plate to be cut with a tool at the initial cutting position.
Figure 2B:
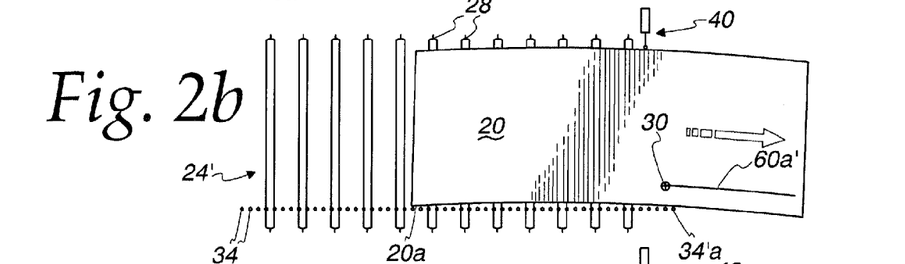
FIG. 2b shows the mill plate as moved to cut a first side of the rectangular piece.
Figure 2C:
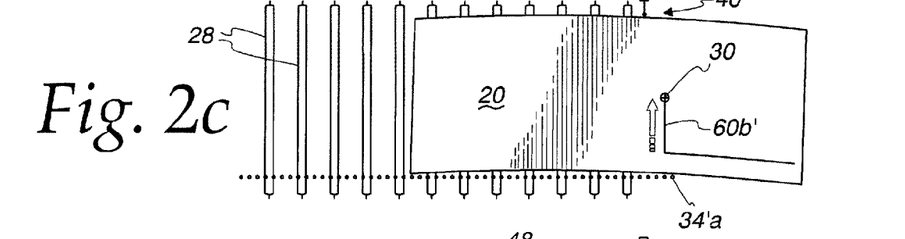
FIG. 2c shows the mill plate as the tool is moved to cut a second side of the rectangular piece.
Figure 2D:
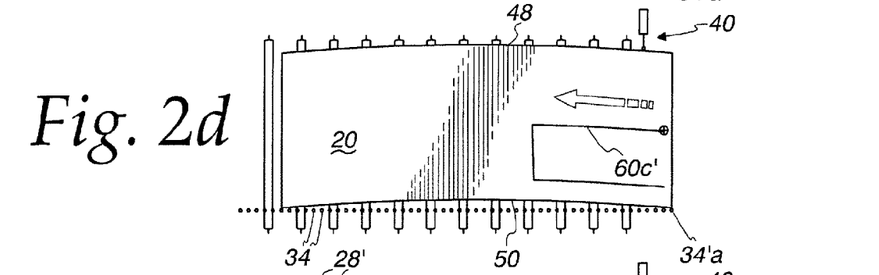
FIG. 2d shows the mill plate as moved to cut a third side of the rectangular piece.
Figure 2E:
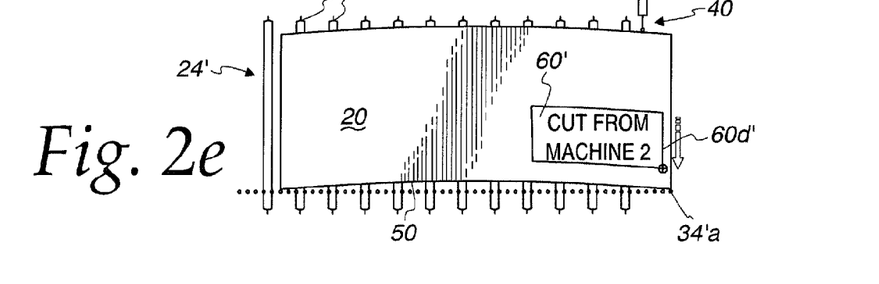
FIG. 2e shows the mill plate as the tool is moved to cut the fourth, final side of the rectangular piece.

Cutting of a rectangular cut piece 60 (see FIG. 1e) according to this prior art method is illustrated by the sequence of views in FIGS. 1a-1e. The mill plate 20 is first positioned so that the cutting tool 30 is positioned over one corner of the piece to be cut (FIG. 1a). The mill plate 20 is then moved horizontally by the conveyor 24 in the direction of arrow 62 (FIG. 1b), with the cutting tool 30 cutting one side 60a of the piece 60 during that movement. During that movement, the mill plate 20 is positioned by the pusher 40 pushing one mill plate edge 48 to keep the other mill plate edge 50 in contact with the vertical datum rollers 34 (aligned with the cutting tool 30) to cut one side 60a of the piece 60.

When the next corner of the piece 60 is reached, the conveyor 24 stops and holds the mill plate 20 in position while the cutting tool 30 is moved laterally across the mill plate 20 (in the direction of arrow 64, FIG. 1c) to cut a second side 60b of the piece 60.

The conveyor 24 then moves the mill plate 20 horizontally in a reverse direction (arrow 66, FIG. 1d), with the cutting tool 30 cutting a third side 60c of the piece 60 during that movement. During that movement, the mill plate 20 is positioned by the pusher 40 pushing one mill plate edge 48 to keep the other mill plate edge 50 in contact with the vertical datum rollers 34 (aligned with the cutting tool 30) to cut one side 60a of the piece 60.

Finally, when the fourth corner of the rectangular piece 60 is reached, the conveyor 24 again stops and holds the mill plate 20 in position while the cutting tool 30 is moved laterally across the mill plate 20 (in the direction of arrow 68, FIG. 1e) to cut the fourth side 60d of the piece 60.

It should be appreciated that two of the sides 60a and 60c will be essentially of the same orientation/shape as the longitudinally aligned edge 50 of the mill plate 20. Thus, if the edge 50 is not precisely linear (e.g., due to tolerances or damage), then the sides 60a and 60c will be similarly and undesirably cut in a non-linear fashion.

FIGS. 2a-2e illustrate a second prior art method of cutting large mill plates 20, wherein elements identical to those illustrated in FIGS. 1a-1e are given identical reference numerals and corresponding but different elements are given the same reference numerals with prime ("'") added (e.g., vertical datum rollers 34').

With this second prior art method, the mill plate 20 is oriented during movement by having edge 50 pressed toward vertical datum rollers 34' which are positioned over a longer distance (e.g., along the entire length of the conveyor 20') than described above in connection with FIGS. 1a-1e. However, typically the entry conveyor 24' ends substantially in the area of the cutting tool 30, so that when the mill plate 20 is moved forward through the machine tool (as in FIG. 2b), the forward edge may extend beyond the vertical datum rollers 34'. As a result, with this second method, when cutting a mill plate 20 having a concave edge 50 such as in the illustrated example, the longitudinal orientation of the mill plate 20 will be established by the back corner 20a of the mill plate 20 and the last (forward) vertical datum roller 34'a. It should thus be appreciated that the mill plate 20 will not only move forward when cutting side 60a' (FIG. 2b) and backward when cutting side 60c' (FIG. 2d), but it will also slightly twist (due to the pusher 40 pushing the mill plate 20 laterally during forward and backward motion when the front corner of the mill plate 20 is beyond the last vertical datum roller 34'a).

It should be appreciated that if the edge 50 is not precisely linear (e.g., due to tolerances or damage), two of the sides 60a' and 60c' of the cut piece 60' (which in the example is intended to be rectangular) will be not be linear due to the twisting of the mill plate 20 during cutting of those sides with the second prior art method as well.

The present invention is intended to overcome one or more of these problems.

SUMMARY OF THE INVENTION

The present invention relates to a cutting tool and method whereby a mill plate can be precisely cut notwithstanding imperfections in the sides or edges of the mill plate.

In one aspect of the present invention, a cutting device for a mill plate is provided, including a cutting tool supported for movement in a Y-direction of an X-Y-Z orthogonal coordinate system, and a conveyor adapted to convey a supported mill plate in the X-direction. The cutting tool cuts in the Z-direction through a mill plate lying generally in an X-Y plane with a thickness in the Z-direction. A measuring device at a first portion of the conveyor is movable in the X-direction along one side of a supported mill plate to map the X-axis and Y-axis positions of the supported mill plate one side. A plurality of fixed guide rollers are along the one side of a second portion of the conveyor adjacent the cutting tool, with the rollers rotatable about axes oriented in the Z-direction wherein the axes lie in an X-Z plane. At least two positioning guides are adjacent the conveyor one side on opposite sides of the cutting tool in the X-direction, where the positioning guides adjust the rollers in the Y-direction to follow the mapped Y-axis position of the mill plate one side at the X-axis position of the mill plate one side aligned with the positioning guide as the mill plate is conveyed in the X-direction. At least two clamps on the side opposite the mill plate one side are adapted to push the mill plate opposite side in the Y-direction to maintain the mill plate one side in engagement with the positioning rollers.

In one form of this aspect of the present invention, the positioning guide rollers are rotatable about axes oriented in the Z-direction, and the positioning guide roller axes are selectively movable in the Y-direction.

In another form of this aspect of the present invention, the conveyor is adapted to control the position of the mill plate in the X-direction, and each positioning guide is selectively adjustable to position its roller in the mapped Y-axis position corresponding to the X-axis position of the mill plate one side engaging the positioning guide.

In another aspect of the present invention, a cutting device for a mill plate is provided including a cutting tool supported for movement in a Y-direction of an X-Y-Z orthogonal coordinate system, and a conveyor adapted to convey a supported mill plate in the X-direction. The cutting tool cuts in the Z-direction through a mill plate lying generally in an X-Y plane with a thickness in the Z-direction. A measuring device at a first portion of the conveyor is movable in the X-direction along one side of a supported mill plate to map the X-axis and Y-axis positions of the supported mill plate one side. At least two positioning guides are adjacent the conveyor one side on opposite sides of the cutting tool in the X-direction, where the positioning guides are adjusted in the Y-direction to follow the mapped Y-axis position of the mill plate one side at the X-axis position of the mill plate one side aligned with the positioning guide as the mill plate is conveyed in the X-direction. A clamp on the side opposite the mill plate one side is adapted to push the mill plate opposite side in the Y-direction to maintain the mill plate one side in engagement with the positioning guides.

In one form of this aspect of the present invention, the positioning guides include rollers rotatable about axes oriented in the Z-direction, and the positioning guide roller axes are selectively movable in the Y-direction.

In another form of this aspect of the present invention, a plurality of fixed guide rollers is adjacent the one side of the mill plate on the conveyor, with the plurality of fixed guide rollers being rotatable about axes oriented in the Z-direction wherein the axes lie in a X-Z plane.

In still another form of this aspect of the present invention, the conveyor is adapted to control the position of the mill plate in the X-direction, and each positioning guide is selectively adjustable to position its roller in the mapped Y-axis position corresponding to the X-axis position of the mill plate one side engaging the positioning guide.

In still another aspect of the invention, a method of cutting a mill plate is provided, including the steps of (a) locating a mill plate on a conveyor with the mill plate substantially lying in an X-Y plane with a thickness in the Z-direction of an X-Y-Z orthogonal coordinate system, (b) mapping the X-axis and Y-axis positions of one side of a mill plate extending in generally the X-direction, (c) conveying the mill plate in the X-direction to a cutting tool supported for movement in the Y-direction and generally cutting in the Z-direction, (d) moving the mill plate in the X-direction and the cutting tool in the Y-direction and Z-direction while selectively cutting the mill plate, and (e) during the moving step, biasing the mill plate one side in the Y-direction against positioning guides spaced generally in the X-direction along the mill plate one side, wherein the positioning guides are adjusted in the Y-direction in accordance with mapped variations in the Y-axis positions at the X-axis positions of the mill plate one side aligned with the positioning guides to prevent twisting of the mill plate during moving of the mill plate in the X-direction.

In one form of this aspect of the invention, the mapped X-axis and Y-axis positions of the mill plate one side are stored, and each positioning guide is adjusted to match the Y-axis positions of the mill plate one side with the associated X-axis positions of the mill plate aligned in the X-direction with the aligned positioning guide.

In still another form of this aspect of the invention, the positioning guides are positioned on opposite sides in the X-direction of the cutting tool, and the biasing is accomplished by pushing the mill plate side opposite the one mill plate side toward the positioning guides.

Other objects, features, and advantages of the invention will become apparent from a review of the entire specification, including the appended claims and drawings.

BRIEF DESCRIPTION OF THE DRAWINGS

FIGS. 1a-1e illustrate the steps of a first Prior Art method used to cut a rectangular piece from a mill plate, where:

FIGS. 2a-2e illustrate the steps of a second Prior Art method used to cut a rectangular piece from a mill plate, where:

FIGS. 3a-3j illustrate the steps used to cut a rectangular piece from a mill plate according to the present invention, where:

FIGS. 5-13 are top views of an exemplary machine tool and entry conveyor according to the present invention (with various portions of the machine tool broken away for illustration purposes), where:

DETAILED DESCRIPTION OF THE PREFERRED EMBODIMENT

Figure 14:
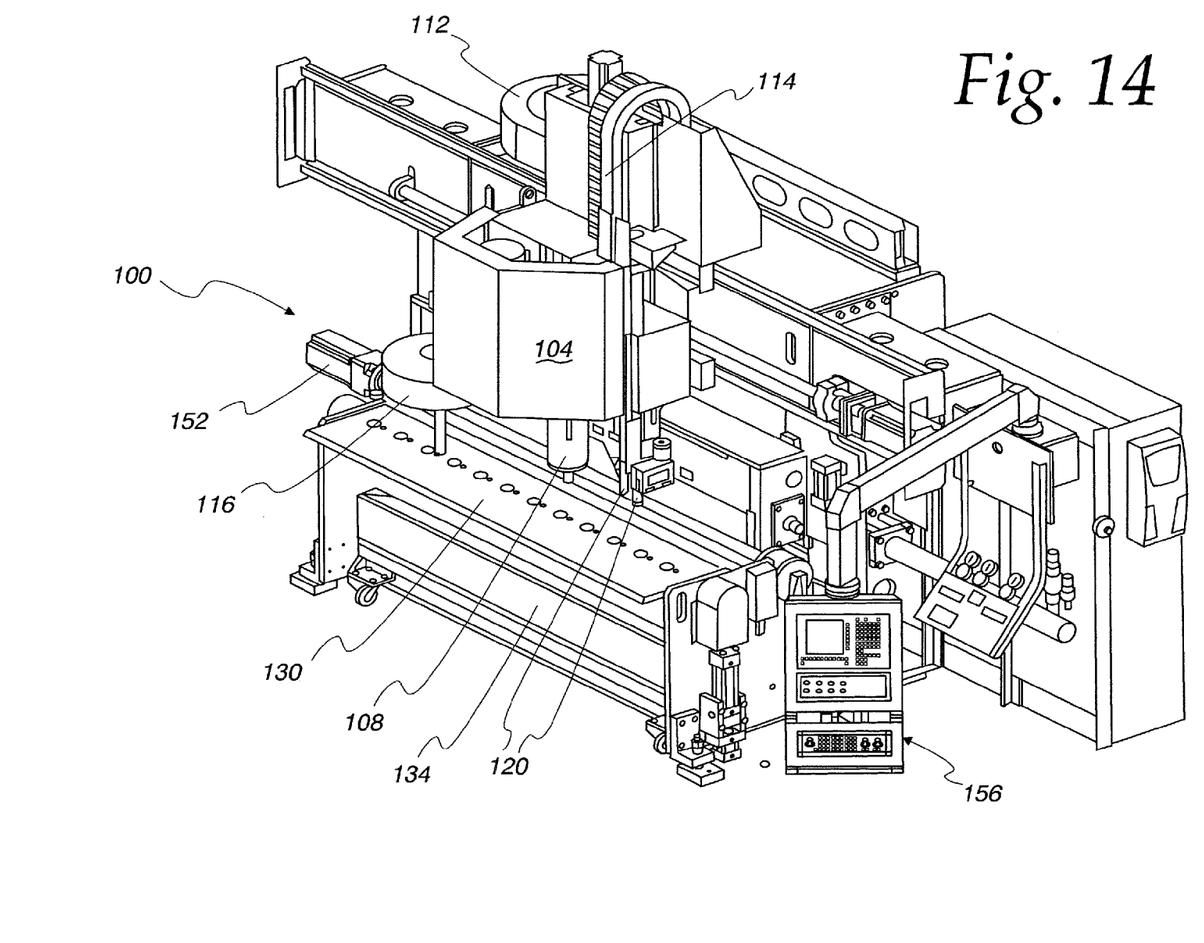
FIG. 14 is a perspective view of the tool/exit side of a machine tool which may be used according to the present invention.
Figure 15:
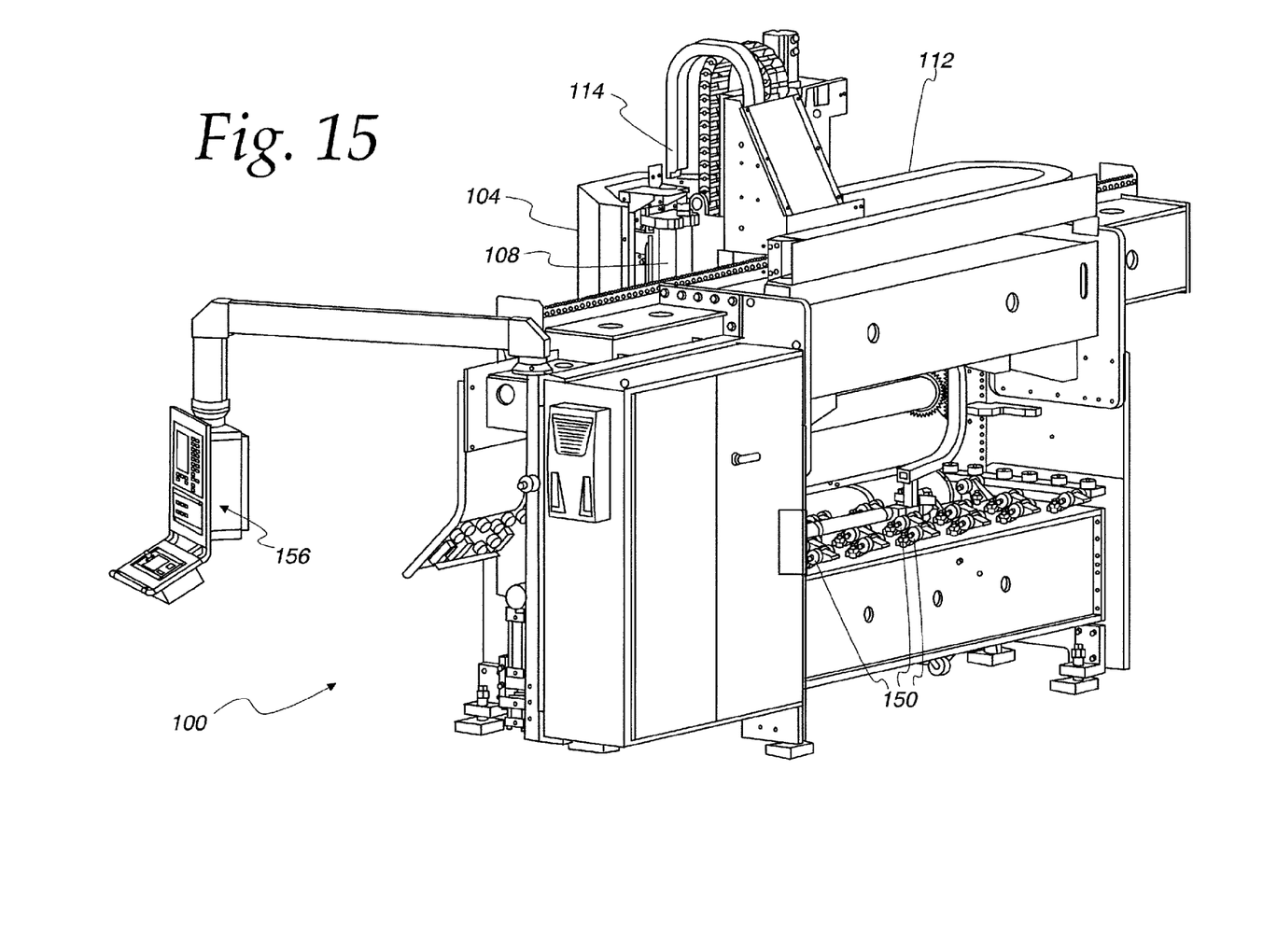
FIG. 15 is a perspective view of the entry side of the machine tool of FIG. 14.

The present invention is illustrated in FIGS. 3a-15, wherein FIGS. 3a-3j illustrate the steps of the method of cutting a piece from a mill plate, FIGS. 5-13 illustrate an exemplary machine tool and conveyor arrangement which may be used to practice the method, and FIGS. 14-15 illustrate the exemplary machine tool.

Referring first to the inventive method, FIGS. 3a-3j illustrate the method of cutting a large mill plates 20, wherein elements identical to those illustrated in FIGS. 1a-1e are given identical reference numerals and corresponding but different elements are given the same reference numerals with double prime ("''") added (e.g., vertical datum rollers 34").

With this novel method, the mill plate 20 is first located on the entry conveyor 24" with at least two locations (e.g., corners at opposite ends) along the longitudinal edge 50 at known, base locations. For example, base plates 70 (FIGS. 5 and 6) may be located at opposite ends of the entry conveyor 24", with the two plates 70 aligned in the X-direction (i.e., along a horizontal line which is perpendicular to the axes of the fixed datum rollers 28). The base plates 70 may also be datum rollers (e.g., datum rollers 34 (FIGS. 2a-2e)). The mill plate 20 may be loaded onto the entry conveyor 24" and then pushed horizontally in the Y-direction (i.e., the direction of the datum roller axes as illustrated by the arrow 72 in FIG. 3a) so that its front and rear corners abut the base plates 70 in known positions in the X-Y plane (see FIG. 3b).

Figure 3A:
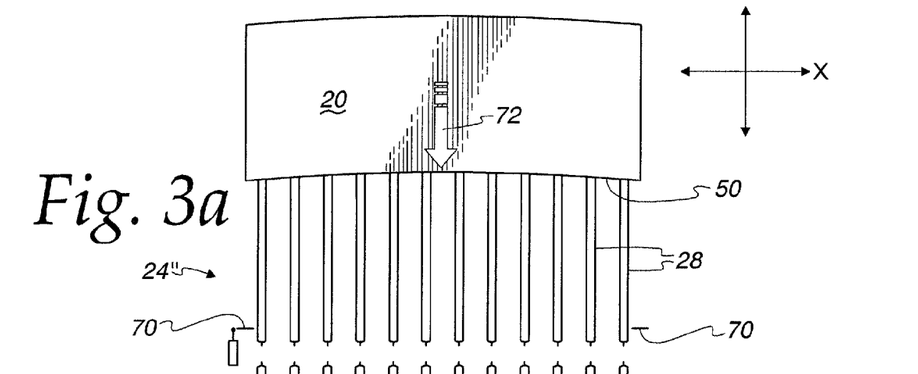
FIG. 3a shows the mill plate prior to being loaded onto an entry conveyor.
Figure 3B:
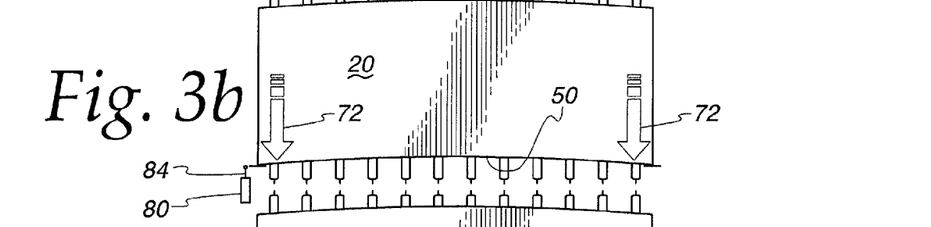
FIG. 3b shows the mill plate as moved onto the entry conveyor.
Figure 3C:
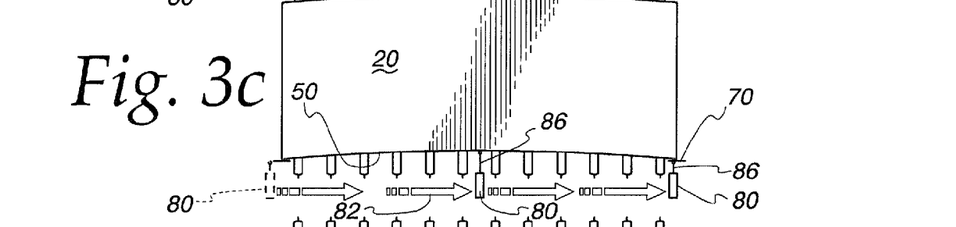
FIG. 3c shows the mill plate as it has one side mapped.

With the mill plate 20 in this known position (see FIGS. 3b-3d), a mapping element or device (e.g., measuring device) 80 is moved in the X-direction (see arrows 82 in FIG. 3c) adjacent the longitudinal edge 50 (the mapping device 80 is shown in three positions in FIG. 3c). The mapping device 80 includes a follower 84 biased outwardly toward the mill plate edge 50 to follow the edge 50 as the mapping device 80 is moved, and the device 80 is connected to a suitable processor and memory for storing the position of the follower (84) at suitable increments (e.g., each inch) along the length of the edge 50. The shape of the plate edge 50 is thus mapped in the X-Y plane according to the position of the mill plate 20 when mapped.

The mill plate 20 is then moved in the X-direction (see arrow 86 in FIGS. 3d-3e) toward the cutting tool 30. In accordance with the present invention, in the area of the cutting tool 30 there are at least two positioning guides 90 spaced in the X-direction on the mapped edge/side 50 of the mill plate 20. Advantageously, the positioning guides 90 may be all short of the Y-direction plane in which the tool 30 cuts (i.e., spaced in the X-direction toward the entry conveyor 24" from the Y-Z plane of the tool 30), so that the guides will not interfere with cutting at the front corner of the plate 20, allowing as much of the plate 20 to be used as possible during cutting operations. Those positioning guides 90 each include a roller 92 which is rotatable about a vertical axis (the Z-axis).

Figures 3D, 3E:
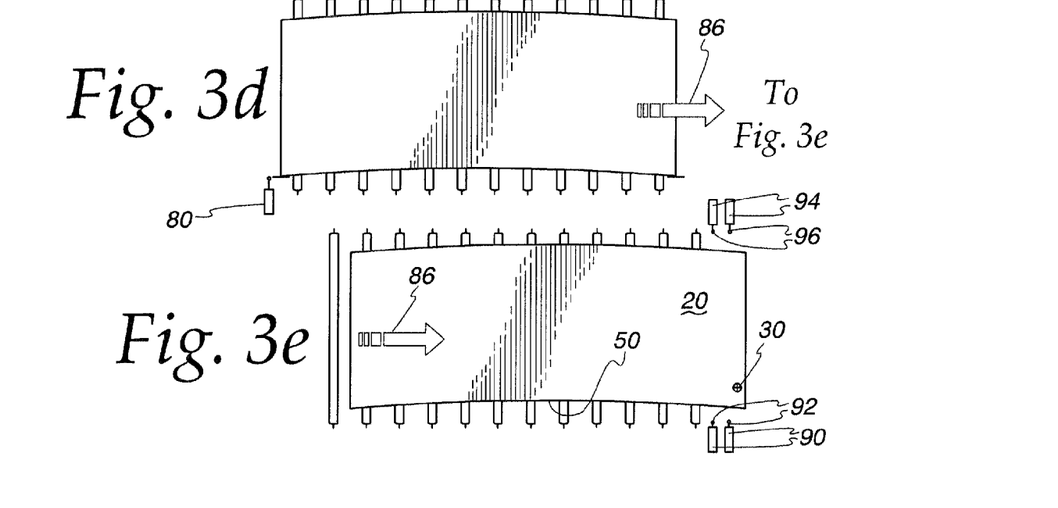
FIG. 3d shows the mill plate as it is moved to a cutting tool for cutting a piece from the plate.
FIG. 3e shows the mill plate positioned relative to a cutting tool for initiation of cutting.

The rollers 92 are selectively moved in the Y-direction during operation. Specifically, as the mill plate 20 is moved over the entry conveyor 24" in the X-direction, the mapped plate edge 50 also moves past the positioning guides 90. Using the stored map of the edge 50 in the X-Y plane, each of the guides 90 are controlled so that their rollers 92 are extended out to the mapped Y-position of the plate edge 50 associated with the X-position of the plate edge 50 aligned with the guide 90.

On the opposite side 48 of the plate 20, biasing clamps or pushers 94 are provided which push against that mill plate side 48 in the Y-direction toward the positioning guides 90. These clamps 94 may advantageously include rollers 96 rotatable about vertical (Z) axes to allow the mill plate 20 to move past them in the X-direction without binding, and are suitably biased with a sufficient force (e.g., by a hydraulic piston configuration) to ensure that the mapped edge 50 of the plate 20 will be kept in contact with the positioning guide rollers 92 on the side opposite the biasing clamps 94.

It should thus be appreciated that, as shown in FIGS. 3f-3j, during cutting of the mill plate 20 by the tool 30, the plate 20 will be moved only in the X-direction, without any twisting occurring around the Z-axis.

Cutting of a rectangular cut piece 60" (see FIG. 3j) in accordance with the present invention thus occurs as illustrated in FIGS. 3f-3j.

Figure 3F:
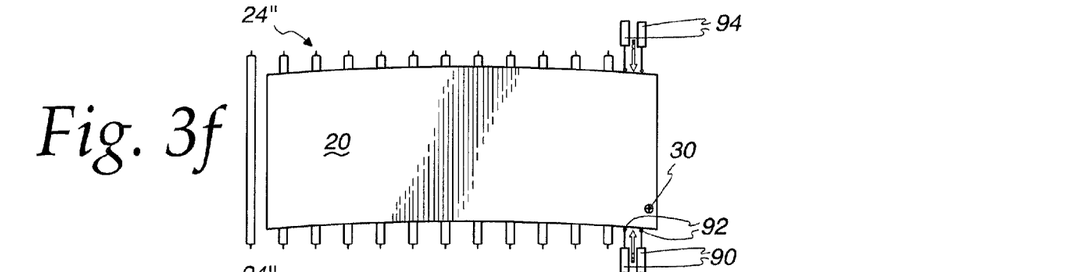
FIG. 3f shows positioning guides being engaged with the mapped side of the mill plate to initial cutting.
Figure 3G:
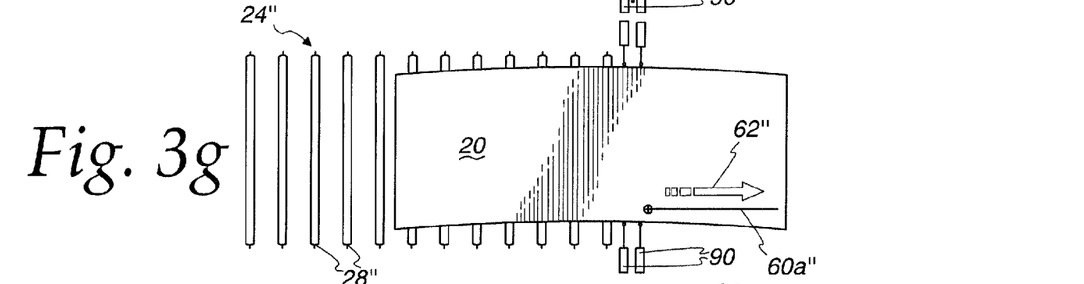
FIG. 3g shows the mill plate as moved to cut a first side of the rectangular piece with the positioning guides adjusted to follow the mapped side of the mill plate as it moves past the guides.
Figure 3H:
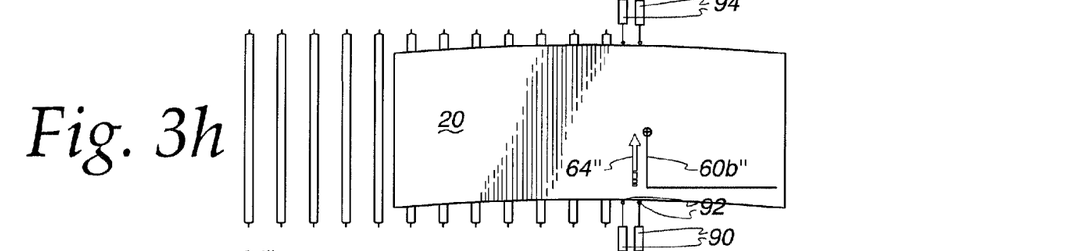
FIG. 3h shows the mill plate as the tool is moved to cut a second side of the rectangular piece.

The mill plate 20 is first positioned so that the cutting tool 30 is positioned over one corner of the piece to be cut (FIG. 3f). The mill plate 20 is then moved horizontally by the conveyor 24 in the X-direction (see arrow 62" in FIG. 3g), with the cutting tool 30 cutting one side 60a" of the piece 60" during that movement. During that movement, the mill plate 20 is pushed on one side 48 by the clamps 94 to keep the opposite, mapped, mill plate edge 50 in contact with the positioning guide rollers 92. It should be appreciated that since the positioning guide rollers 92 will be adjusted to match the mapped shape of the mill plate edge 50 as the mill plate 20 moves past the rollers 92, essentially every point in the mill plate 20 will move in only the X-direction during this operation (i.e., the plate 20 will not twist as can occur with the prior art operations illustrated in FIGS. 1a-1e and 2a-2e).

When the next corner of the piece 60" is reached, the conveyor 24 stops and holds the mill plate 20 in position while the cutting tool 30 is moved laterally across the mill plate 20 (in the direction of arrow 64", FIG. 3h) to cut a second side 60b" of the piece 60".

The conveyor 24 then moves the mill plate 20 horizontally in a reverse X-direction (arrow 66", FIG. 3i), with the cutting tool 30 cutting a third side 60c" of the piece 60" during that movement. During that movement, the mill plate 20 is positioned by the clamps 94 pushing on the side 48 to maintain the mapped side 50 in contact with the positioning guide rollers 92. As with plate movement in the direction of arrow 62" (FIG. 3g), the positioning guide rollers 92 are adjusted to match the mapped shape of the mill plate edge 60, with the rollers 92 positioned at the Y-axis positions mapped as being associated with the X-axis positions aligned with the rollers 92.

Figure 3I:
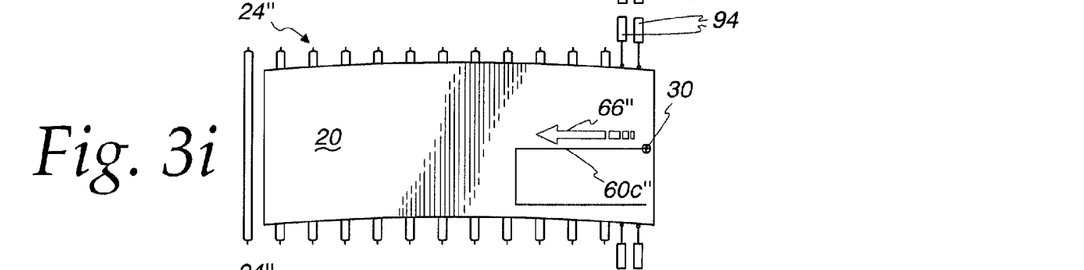
FIG. 3i shows the mill plate as moved to cut a third side of the rectangular piece with the positioning guides adjusted to follow the mapped side of the mill plate as it moves past the guides.
Figure 3J:
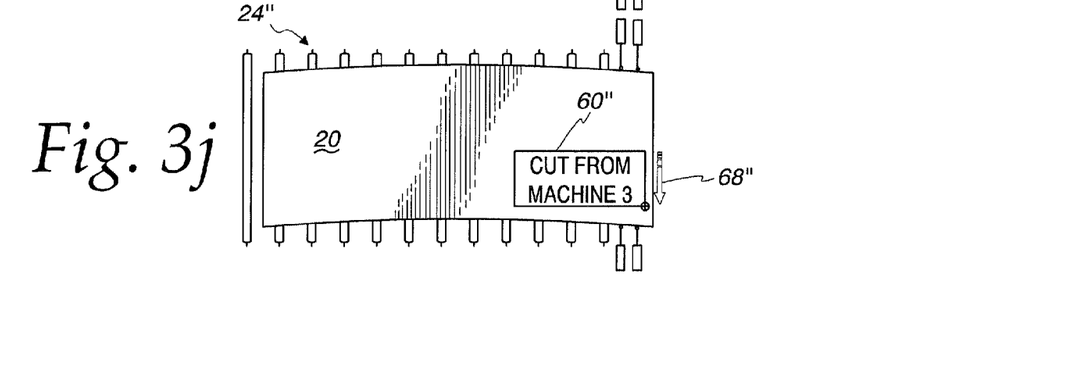
FIG. 3j shows the mill plate as the tool is moved to cut the fourth, final side of the rectangular piece.
Figure 4:
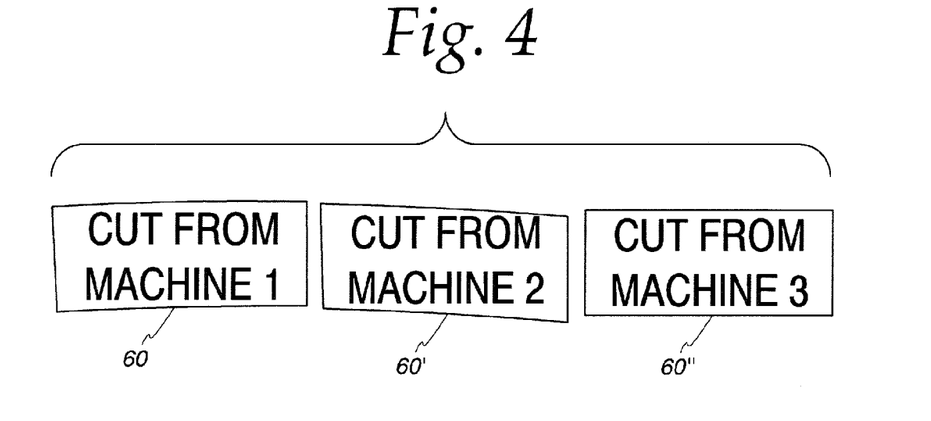
FIG. 4 illustrates a comparison of the pieces according to the methods of FIGS. 1a-1e, 2a-2e, and 3a-3j.

Finally, after the fourth corner is reached at the end of the step illustrated in FIG. 3i, the fourth side 60d" of the piece 60" is cut with the plate 20 held stationary and the tool 30 moved laterally across the mill plate 20 (in the direction of arrow 68", FIG. 3j).

It should be appreciated that whereas two of the sides 60a, 60a' and 60c, 60c' could be neither precisely linear nor at right angles to sides 60b, 60b; and 60d, 60d' (e.g., if tolerances or damage result in the plate side 50 not being linear) when the piece 60, 60' is cut according to one of the described prior art procedures, the sides 60a"-60d" of a rectangular piece 60" cut according to the present invention would all be straight and at right angles to each other.

Of course, it should be appreciated that while the above described example of cutting a rectangular piece has been used for illustrative purposes, the present invention can be used to ensure that pieces are precisely cut to different desired shapes as well.

FIGS. 5-15 illustrate in greater detail a machine which may be used to practice the present invention, with FIGS. 14-15 illustrating an exemplary machine tool 100 with which the present invention may be advantageously used.

Specifically, the machine tool 100 of FIGS. 14-15 includes a carriage 104 which supports a tool spindle 108 for movement in the Y-direction along a cable track 112, where the tool in the tool spindle 108 may be moved in the Z-direction along a vertical rail 114 for cutting into an underlying mill plate. A rotary tool changer 116 is also provided adjacent the tool spindle 108 for allowing different tools to be loaded into the spindle for use in different cutting. Additionally, gas and plasma torches 120 may also be secured on the carriage 104 for movement in the Y-direction for still further forms of cutting as needed.

On the exit side of the machine tool 100, a dump table 130 is provided to facilitate handling of scrap and cut pieces after cutting. As is known, the dump table 130 may be moved up and down and tilted to facilitate dumping of scrap into a scrap hopper 134 disposed beneath the dump table 130. The scrap hopper 134 may be rolled from beneath the dump table 130 to allow it to be emptied. An exit conveyor 140 with suitable rollers 142 (not shown in FIG. 14; see FIGS. 5-13) may also be provided, if desired, on the exit side of the machine tool 100 to provide suitable support for the mill plate and/or cut pieces if necessary.

Wheels or rollers 150 (see FIG. 15) are variously located on the entry side of the machine tool 100 and are controlled by a X-axis drive 152 (FIG. 14). The wheels 150 engage the bottom of a mill plate which enters the machine tool 100, and are controllably rotated to move the mill plate in the X-direction as required for cutting. A suitable control 156, with a processor and memory, is provided to control the machine tool 100, as well as controlling the entry conveyor 24. The control 156 may also control the mapping device 80 during mapping of the longitudinal edge 50 of the mill plate 20 and store the mapped X-Y coordinates of the edge 50 for use during cutting as previously described. However, a separate control, such as a programmable logic controller (PLC), could be used for the mapping device 80 and/or positioning guides 90, which may run in the background without affecting the machine control logic (whereby a pre-made part program can be used without requiring updating to compensate for the mapped plate side 50).

It should be appreciated that machine tools of a variety of designs, and having a variety of features, can be used with the present invention including, for example, High Speed Plate Systems (e.g., the High Speed FDB-2500) available from Peddinghaus Corporation (300 North Washington Avenue, Bradley, Ill. 60915) and its related companies.

Operation of a machine tool 100 such as described above with the present invention is illustrated in FIGS. 5-13 (wherein various portions of the overlying machine tool 100 are broken away for illustration purposes).

Figure 5:
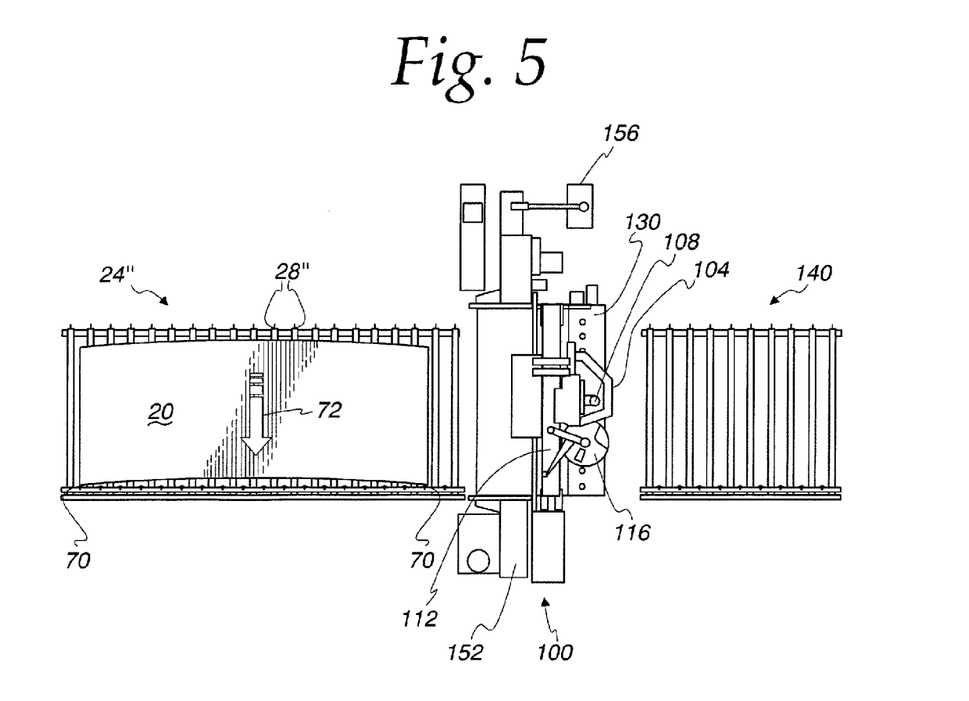
FIG. 5 shows a mill plate as moved onto the entry conveyor as illustrated in the step of FIG. 3b.
Figure 6:
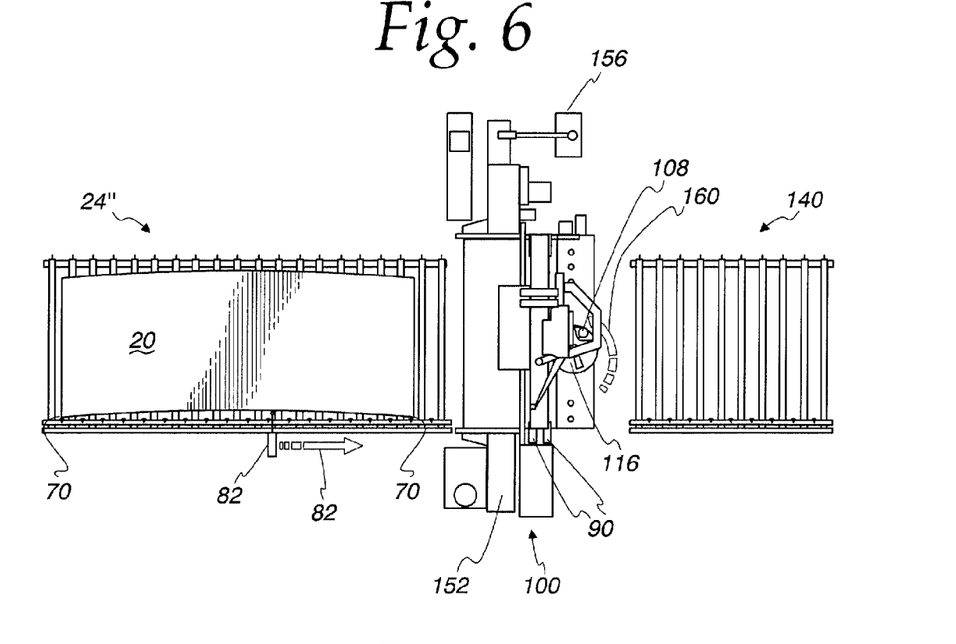
FIG. 6 shows the mill plate as it has one side mapped as illustrated in the step of FIG. 3c.
Figure 7:
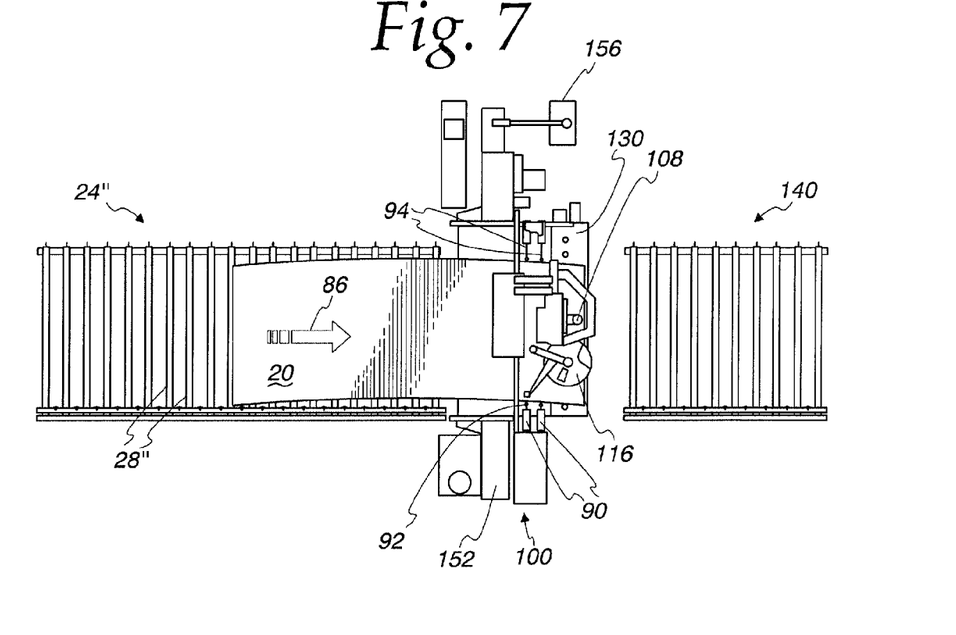
FIG. 7 shows the mill plate as it is moved to the machine tool, with the positioning guides moved into engagement with the mapped side of the mill plate, prior to cutting a piece from the plate as illustrated in the steps of FIGS. 3d-3f.

As illustrated in FIG. 5, a mill plate 20 is first moved onto the entry conveyor 24 and biased in the Y-direction so that it is oriented in a fixed position (e.g., with two points, the front and rear corners of a concave longitudinal side 50, against base plates/datum rollers 70).

While held in that position, the mill plate longitudinal edge 50 is mapped by movement of the mapping device 80 which moves along the length of the side (arrow 80) and follows and measures the Y-direction position of the side 50 at selected intervals (e.g., each inch). The mapped positions of the longitudinal side 50 are stored in the control 156.

While mapping of the mill plate longitudinal edge 50 is being done, the machine tool 100 may also be prepared for the desired cutting of the mill plate 20. For example, the rotary tool changer 116 may be moved (see arrow 160 in FIG. 6) to the tool spindle 108 for loading of the appropriate tool.

The mill plate 20 is then advanced into the machine tool 100 along the entry conveyor 24 (see arrow 86 in FIG. 7) so that the leading end of the mill plate 20 is disposed between the positioning guides 90 and clamps 94. Advancing of the mill plate 20 may be accomplished in any suitable manner. For example, the rollers 28" of the entry conveyor 24" may be driven until the plate 20 is suitably engaged by the entry wheels 150 (see FIG. 15) at which point the conveyor rollers 28" may be released to spin freely with more precise movement of the plate 20 thereafter being controlled by the entry wheels 150. It should also be appreciated, however, that movement of the plate 20 in the X-direction could be suitably driven in a variety of manners, including driven rollers engaging the sides of the plate 20.

At that point, operation continues as generally described herein in connection with FIGS. 3f-3j (with the illustration, again, being of cutting a rectangular piece 60" for simplicity).

That is, the rollers 92 of the positioning guides 90 are selectively moved in the Y-direction as the mill plate 20 is moved over the entry conveyor 24" in the X-direction. Using the stored map of the edge 50 in the X-Y plane, each of the guides 90 are controlled so that their rollers 92 are extended out to the mapped Y-position of the plate edge 50 associated with the X-position of the plate edge 50 aligned with the guide 90.

On the opposite side 48 of the plate 20, biasing clamps 94 push against that mill plate side 48 in the Y-direction toward the positioning guides 90 to ensure that the mapped edge 50 of the plate 20 will be kept in contact with the positioning guide rollers 92 on the side opposite the biasing clamps 94. Therefore, during cutting of the mill plate 20 by the tool 30 in the tool spindle 108, the plate 20 will be moved only in the X-direction, without any twisting occurring around the Z-axis.

Figure 8:
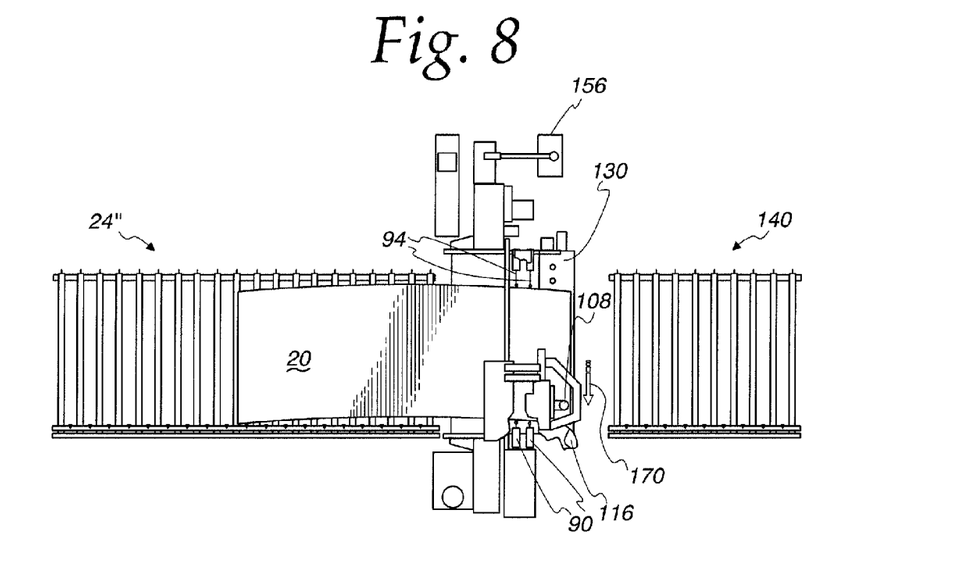
FIG. 8 shows the mill plate as illustrated in FIG. 7, with the cutting tool moved to the starting point in preparation for cutting the piece.
Figure 9:
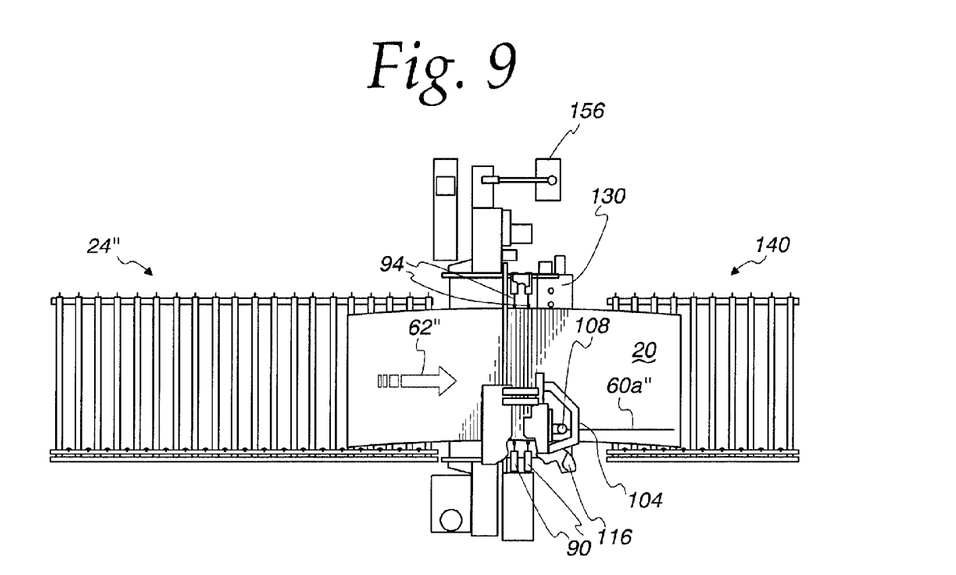
FIG. 9 shows the mill plate as moved to cut a first side of the rectangular piece with the positioning guides adjusted to follow the mapped side of the mill plate as it moves past the guides as illustrated in the step of FIG. 3g.
Figure 10:
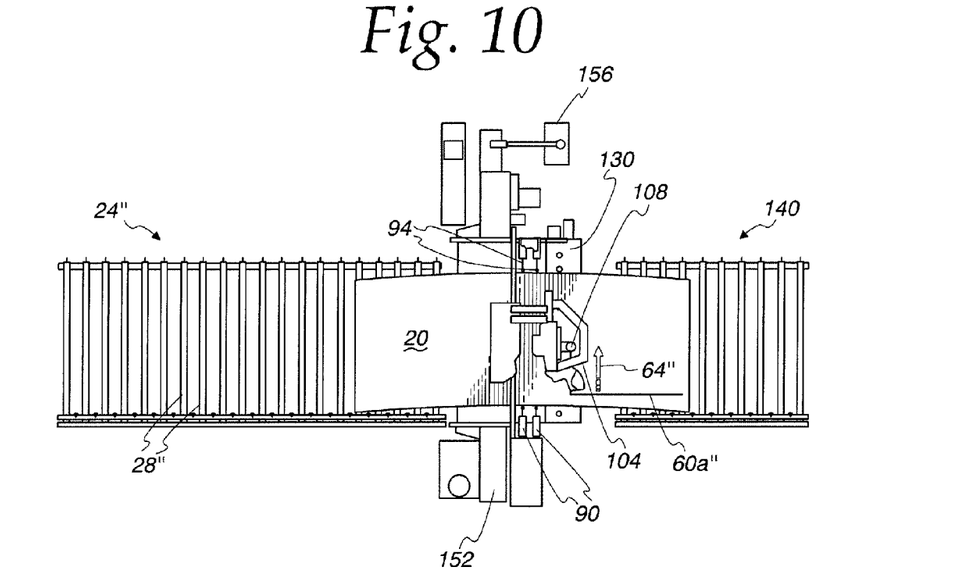
FIG. 10 shows the mill plate as the tool is moved to cut a second side of the rectangular piece as illustrated in the step of FIG. 3h.

To cut a rectangular cut piece 60" (see FIGS. 12-13), the mill plate 20 and machine tool 100 are first positioned as shown in FIG. 8, with the tool spindle 108 and tool 30 moved (see arrow 170 in FIG. 8) over one corner of the piece to be cut. The mill plate 20 is then moved horizontally by the conveyor 24 in the X-direction (see arrow 62" in FIG. 9), with the cutting tool 30 cutting one side 60a" of the piece 60" during that movement. During that movement, the mill plate 20 is pushed on one side 48 by the clamps 94 to keep the opposite, mapped, mill plate edge 50 in contact with the positioning guide rollers 92. Since the positioning guide rollers 92 are adjusted to match the mapped shape of the mill plate edge 50 as the mill plate 20 moves past the rollers 92, essentially every point in the mill plate 20 will move in only the X-direction during this operation (i.e., the plate 20 will not twist as can occur with the prior art operations illustrated in FIGS. 1a-1e and 2a-2e).

When the next corner of the piece 60" is reached, the mill plate 20 is held in a fixed position while the tool spindle 108 and tool 30 is moved laterally across the mill plate 20 (in the direction of arrow 64", FIG. 10) to cut a second side 60b" of the piece 60".

The conveyor 24 then moves the mill plate 20 horizontally in a reverse X-direction (arrow 66", FIG. 11), with the tool spindle 108 and tool 30 cutting a third side 60c" of the piece 60" during that movement. During that movement, the mill plate 20 is positioned by the clamps 94 pushing on the side 48 to maintain the mapped side 50 in contact with the positioning guide rollers 92. As with plate movement in the direction of arrow 62" (FIG. 9), the positioning guide rollers 92 are adjusted to match the mapped shape of the mill plate edge 60, with the rollers 92 positioned at the Y-axis positions mapped as being associated with the X-axis positions aligned with the rollers 92.

Figure 11:
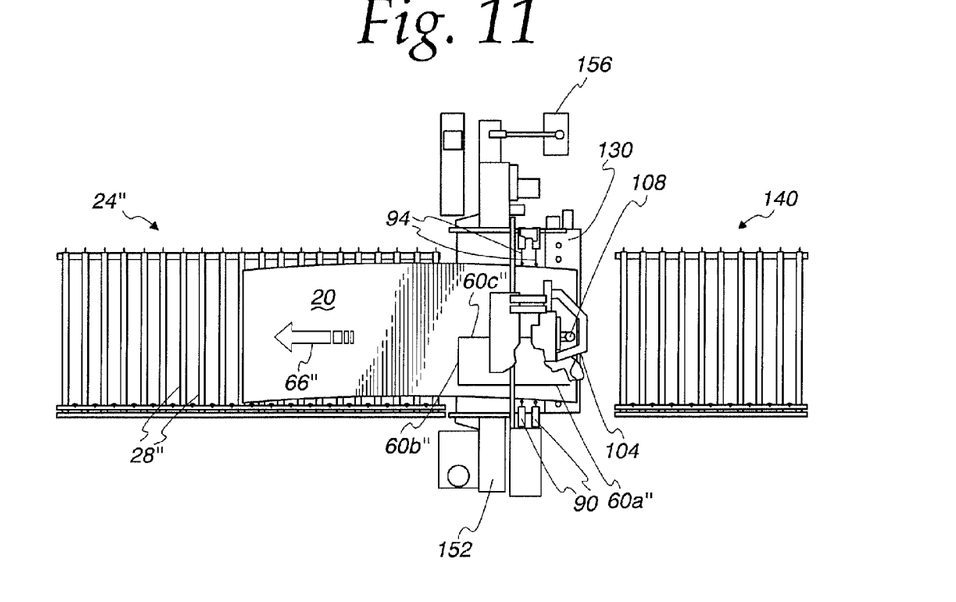
FIG. 11 shows the mill plate as moved to cut a third side of the rectangular piece with the positioning guides adjusted to follow the mapped side of the mill plate as it moves past the guides as illustrated in the step of FIG. 3i.
Figure 12:
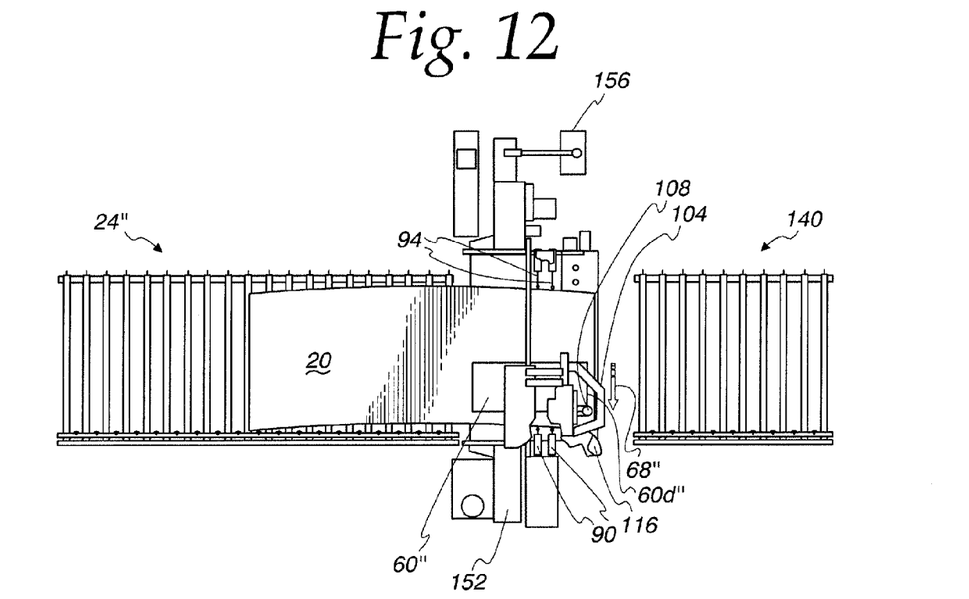
FIG. 12 shows the mill plate as the tool is moved to cut the fourth, final side of the rectangular piece as illustrated in the step of FIG. 3j.
Figure 13:
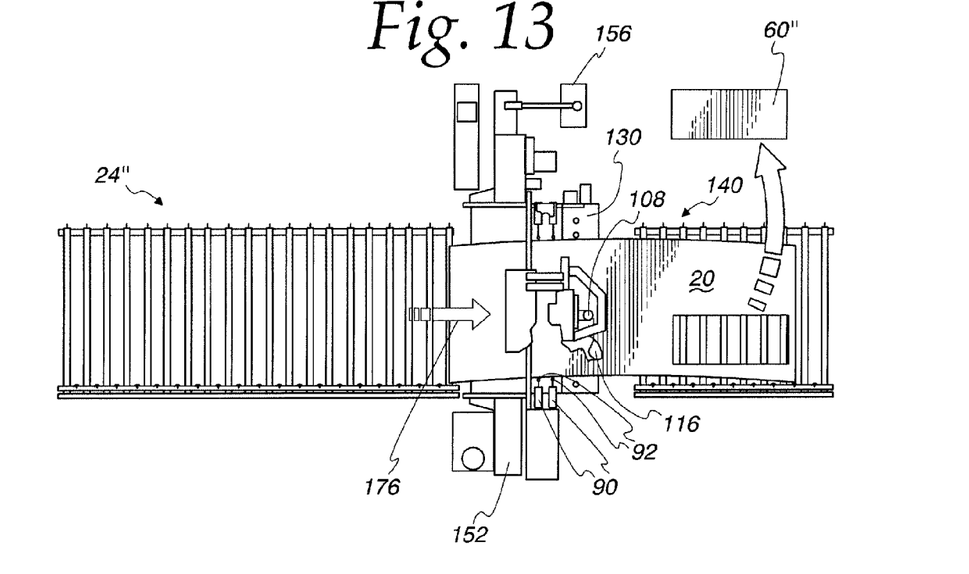
FIG. 13 shows the mill plate advanced through the machine tool to enable removal of the cut piece from the mill plate.

After the fourth corner is reached at the end of the step illustrated in FIG. 11, the fourth side 60d" of the piece 60" is cut with the plate 20 held stationary and the tool spindle 108 and tool 30 moved laterally across the mill plate 20 (in the direction of arrow 68", FIG. 12).

After the piece 60" is fully cut, the mill plate 20 may be suitably advanced (in the direction of arrow 176, FIG. 13) to clear the cut piece 60" from the machine tool 100 so that it may be suitably removed and taken where needed.

It should be appreciated that the present invention will allow precise cutting of a piece from a mill plate, even where the mill plate has an irregular side. This will enable cut pieces to meet the smallest of tolerances despite such plate irregularities.

The invention claimed is:

1. A cutting device for a mill plate, comprising:
    a cutting tool supported for movement in a Y-direction of an X-Y-Z orthogonal coordinate system, said cutting tool cutting in the Z-direction through a mill plate lying generally in an X-Y plane with a thickness in the Z-direction;
    a conveyor adapted to convey a supported mill plate in the X-direction;
    a measuring device at a first portion of the conveyor, said measuring device being located on one side of said conveyor and being movable in the X-direction along one side of a supported mill plate to map the X-axis and Y-axis positions of the supported mill plate one side;
    a plurality of fixed guide rollers along said one side of a second portion of the conveyor adjacent the cutting tool, said rollers rotatable about axes oriented in the Z-direction wherein said axes lie in a X-Z plane;
    at least two positioning guides adjacent the conveyor one side, said positioning guides adjusting said rollers in the Y-direction to follow said mapped Y-axis position of the mill plate one side at the X-axis position of the mill plate one side aligned with the positioning guides as the mill plate is conveyed in said X-direction; and
    at least two clamps on the side opposite the mill plate one side adapted to push the mill plate opposite side in the Y-direction to maintain the mill plate one side in engagement with the positioning rollers.

2. The cutting device of claim 1, wherein said positioning guide rollers are rotatable about axes oriented in the Z-direction, and said positioning guide roller axes are selectively movable in the Y-direction.

3. The cutting device of claim 1, wherein said conveyor is adapted to control the position of the mill plate in the X-direction, and each positioning guide is selectively adjustable to position its roller in the mapped Y-axis position corresponding to the X-axis position of the mill plate one side engaging the positioning guide.

4. A cutting device for a mill plate, comprising:
- a cutting tool supported for movement in a Y-direction of an X-Y-Z orthogonal coordinate system, said cutting tool cutting in the Z-direction through a mill plate lying generally in an X-Y plane with a thickness in the Z-direction;
- a conveyor adapted to convey a supported mill plate in the X-direction;
- a measuring device at a first portion of the conveyor, said measuring device being located on one side of said conveyor and being movable in the X-direction along one side of a supported mill plate to map the X-axis and Y-axis positions of the supported mill plate one side;
- at least two positioning guides adjacent the conveyor one side, said positioning guides adjusted in the Y-direction to follow said mapped Y-axis position of the mill plate one side at the X-axis position of the mill plate one side aligned with the positioning guides as the mill plate is conveyed in said X-direction; and
- a clamp on the side opposite the mill plate one side adapted to push the mill plate opposite side in the Y-direction to maintain the mill plate one side in engagement with the positioning guides.

5. The cutting device of claim 4, wherein said positioning guides include rollers rotatable about axes oriented in the Z-direction, and said positioning guide roller axes are selectively movable in the Y-direction.

6. The cutting device of claim 4, further comprising a plurality of fixed guide rollers adjacent said one side of the mill plate on said conveyor, said plurality of fixed guide rollers being rotatable about axes oriented in the Z-direction wherein said axes lie in a X-Z plane.

7. The cutting device of claim 4, wherein said conveyor is adapted to control the position of the mill plate in the X-direction, and each positioning guide includes a roller and is selectively adjustable to position its roller in the mapped Y-axis position corresponding to the X-axis position of the mill plate one side engaging the positioning guide.

8. A method of cutting a mill plate, comprising:
- locating a mill plate on a conveyor with the mill plate substantially lying in an X-Y plane with a thickness in the Z-direction of an X-Y-Z orthogonal coordinate system;
- mapping the X-axis and Y-axis positions of one side of the mill plate, said mill plate one side extending in generally the X-direction;
- conveying the mill plate in the X-direction to a cutting tool supported for movement in the Y-direction, said cutting tool generally cutting in the Z-direction;
- moving said mill plate in the X-direction and said cutting tool in the Y-direction and Z-direction while selectively cutting said mill plate; and
- during said moving step, biasing said mill plate one side in the Y-direction against positioning guides spaced generally in the X-direction along said mill plate one side, wherein said positioning guides are adjusted in the Y-direction in accordance with mapped variations in the Y-axis positions at the X-axis positions of the mill plate one side aligned with the positioning guides to prevent twisting of the mill plate during moving of said mill plate in the X-direction.

9. The method of claim 8, further comprising storing said mapped X-axis and Y-axis positions of said mill plate one side, and adjusting each positioning guide to match the Y-axis positions of the mill plate one side with the associated X-axis positions of said mill plate aligned in the X-direction with said positioning guides.

10. The method of claim 8, wherein said biasing is accomplished by pushing the mill plate side opposite said mill plate one side toward said positioning guides.

\* \* \* \* \*